United States Patent [19]

Orlandi

[11] Patent Number: 5,433,378
[45] Date of Patent: Jul. 18, 1995

[54] HOT AND COLD WATER MIXER VALVE ASSEMBLY WITH THERMOSTATIC REGULATION

[75] Inventor: Alessio Orlandi, Castiglione D/Stiviere, Italy

[73] Assignee: Galatron S.r.l., Castiglione D/Stiviere, Italy

[21] Appl. No.: 192,675

[22] Filed: Feb. 7, 1994

[30] Foreign Application Priority Data

Feb. 9, 1993 [IT] Italy ................. BS93A0008

[51] Int. Cl.⁶ ......................................... G05D 23/13
[52] U.S. Cl. ................... 236/122; 236/12.22
[58] Field of Search ............... 236/12.2, 12.21, 12.22

[56] References Cited

U.S. PATENT DOCUMENTS

| | | | |
|---|---|---|---|
| 3,366,328 | 1/1968 | Feinberg | 236/12.2 |
| 3,685,728 | 8/1972 | Chapou | 236/12.2 |
| 4,029,256 | 6/1977 | Dauga | 236/12.2 |
| 4,607,788 | 8/1986 | Bendall et al. | 236/12.21 X |
| 5,129,576 | 7/1992 | Pullen et al. | 236/12.2 |

*Primary Examiner*—William E. Tapolcai
*Attorney, Agent, or Firm*—McGlew and Tuttle

[57] ABSTRACT

The invention covers a not and cold water mixer valve with thermostatic regulation, which comprises a valve body enclosing a ceramic-disc valve assembly and a thermosensitive bulb (30) arranged axially, centered and contiguos with the valve assembly, susceptible of axial dilatation and free from any control functions for the opening/closing of the valve.

6 Claims, 3 Drawing Sheets

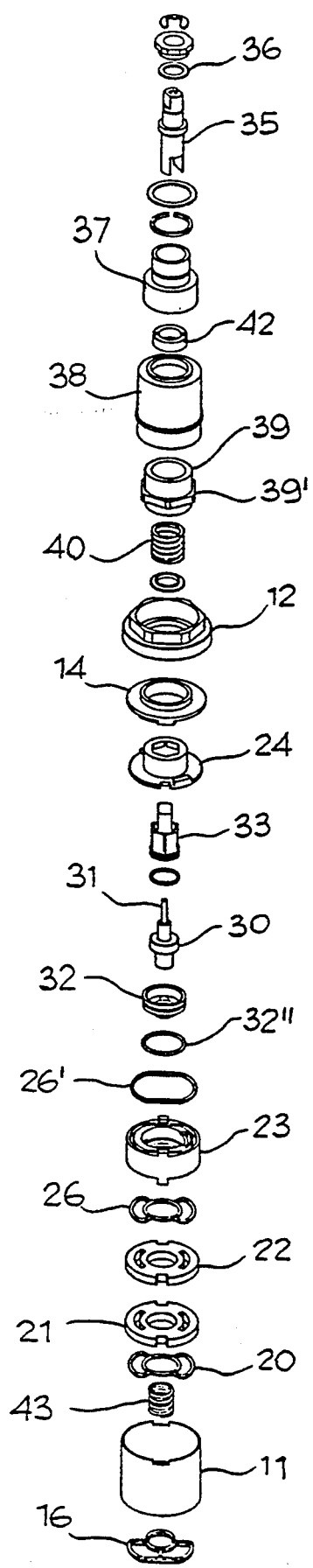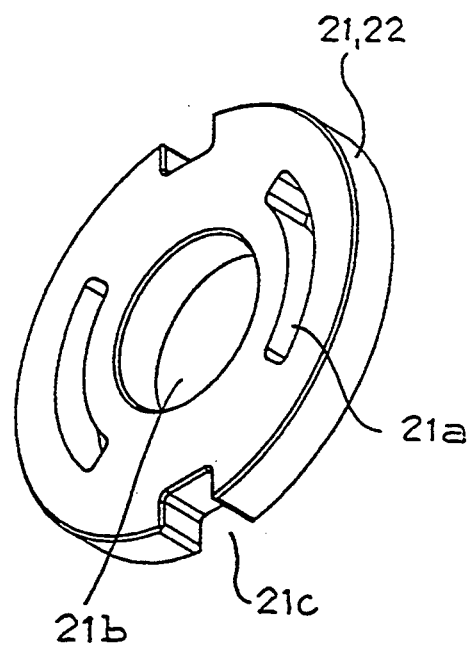
Fig.3
Fig.4

HOT AND COLD WATER MIXER VALVE ASSEMBLY WITH THERMOSTATIC REGULATION

FIELD OF THE INVENTION

The present invention concerns hot and cold water mixer taps for sanitary fittings, and it particularly relates to a ceramic-disc mixer valve embodying a thermostatic regulator.

BACKGROUND OF THE INVENTION

On the one hand, mixer valves are known which can be inserted into tap bodies like cartridges and which comprise ceramic-disc valve assemblies to control the delivery of hot water, cold water or mixed water resulting from the displacement of a displaceable disc on another fixed disc. The fixed and displaceable discs are usually provided with inlet passages for hot and cold water and with one outlet passage for the delivery of mixed water to the tap spout.

On the other hand, various types of hot and cold water mixer taps are known which comprise thermostatic regulators designed to interact with a sliding unit which varies the inlet openings for cold and hot water in order to change the mixing ratio of the two types of water according to the temperature required for the fluid delivered. In known arrangements, the thermosensitive unit is often designed to perform control functions and to operate the valve elements as well, thus being subject to considerable mechanical stress.

SUMMARY AND OBJECTS OF THE INVENTION

It is an object of the present invention to provide a mixer valve assembly integrated with a thermostatic regulator and advantageously interchangeable with normal ceramic-disc mixer valves commonly in use. In fact, the valve assembly proposed by this invention—as regards the body member which includes the ceramic discs and trough which water flows—keeps the same dimensions, the same structure, the same inlet and outlet passages for water and the same fixing modalities as common mixer valves, and additionally includes a raised part containing means for controlling the thermostatic unit. In this way, and conveniently, any normal mixer valve may be replaced with the thermostatic valve according to the present invention at any time and with no changes, with evident advantages as regards temperature regulation of the water delivered.

Another object of the invention is to provide a thermostatic mixer valve assembly of the type described above, in which the thermosensitive element is free from any control functions and therefore it is not subject to any mechanical stresses, thus ensuring the utmost efficiency thereof.

A further object of the invention is to provide a thermostatic valve with particularly simple and compact structure, having the same number of ceramic discs, usually two, as traditional mixer valves and comprising new operating elements for controlling opening/closing integrated with the regulation means of the thermostatic unit.

Another object of the invention is to provide a thermostatic mixer valve assembly in which the ceramic discs are advantageously identical.

A further object of the invention is to provide a mixer valve assembly with a thermostatic regulator in which the thermosensitive element is concentric with and adjacent to the ceramic discs, in order to be essentially influenced by the water proximate to the valve outlet, and not by inflowing water. Advantageously, this embodiment permits to better control and regulate the temperature of the water delivered, independently of the temperature of the hot and cold water supplied and of any possible variation thereof.

Furthermore, the arrangement of a ceramic-disc valve assembly permits to eliminate any non-return valve, since the said assembly in itself is sufficient to ensure tightness in closing.

Further characteristics of the invention will become apparent from the continuation of the description, illustrated by way of non-limitative example in the accompanying drawings.

BRIEF DESCRIPTION OF THE DRAWINGS

FIG. 3 shows the same sectional view of the mixer tap as FIG. 2, though with the inlet passages for hot water supply closed and the inlet passages for cold water supply open; and FIG. 4 shows a perspective view of one of the ceramic discs used in the mixer tap, the other disc being identical.

DETAILED DESCRIPTION OF THE PREFERRED EMBODIMENT

Figure 1:
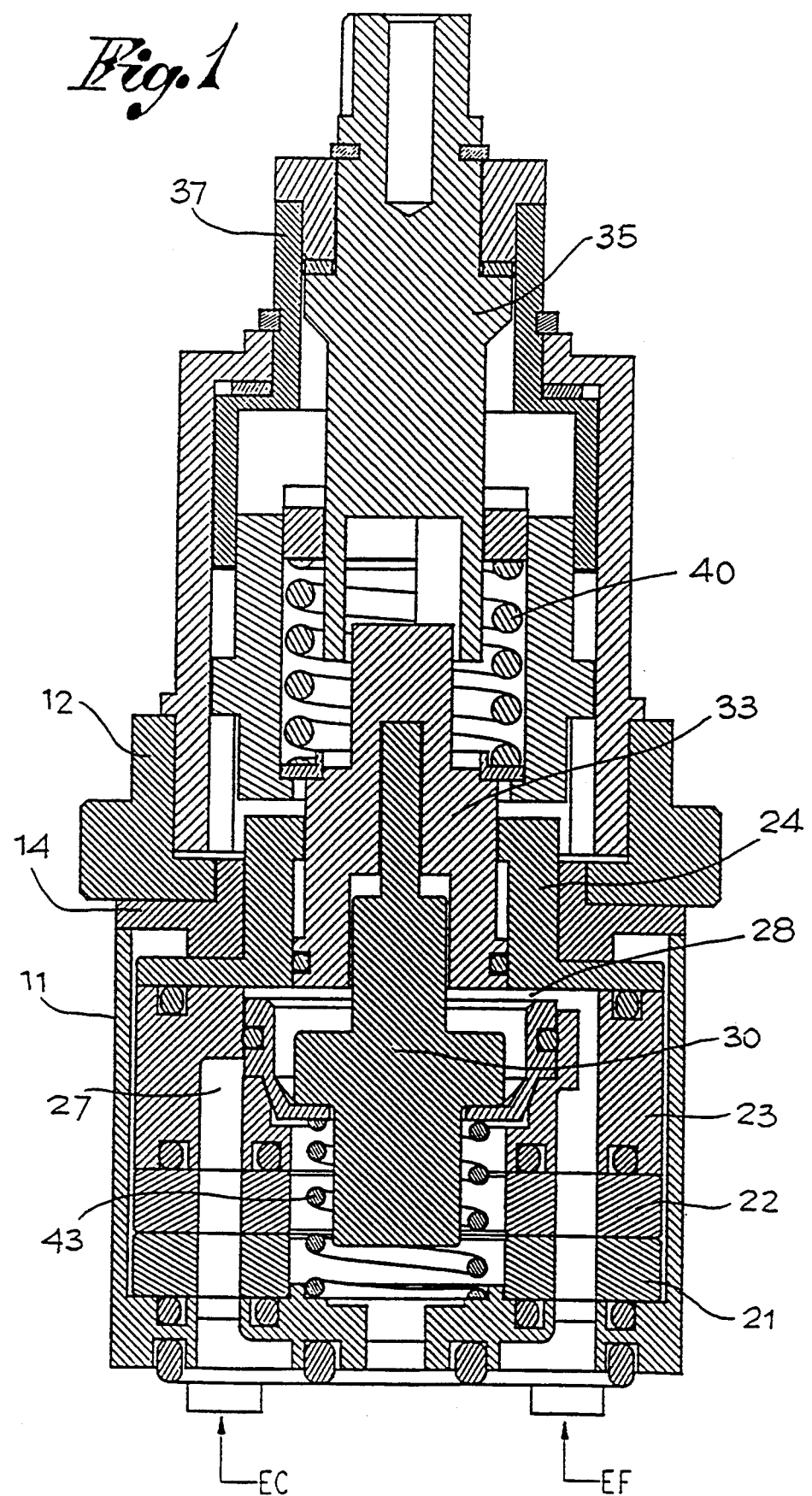
FIG. 1 shows an exploded view of the components of a thermostatic mixer tap according to the invention.
Figure 2:
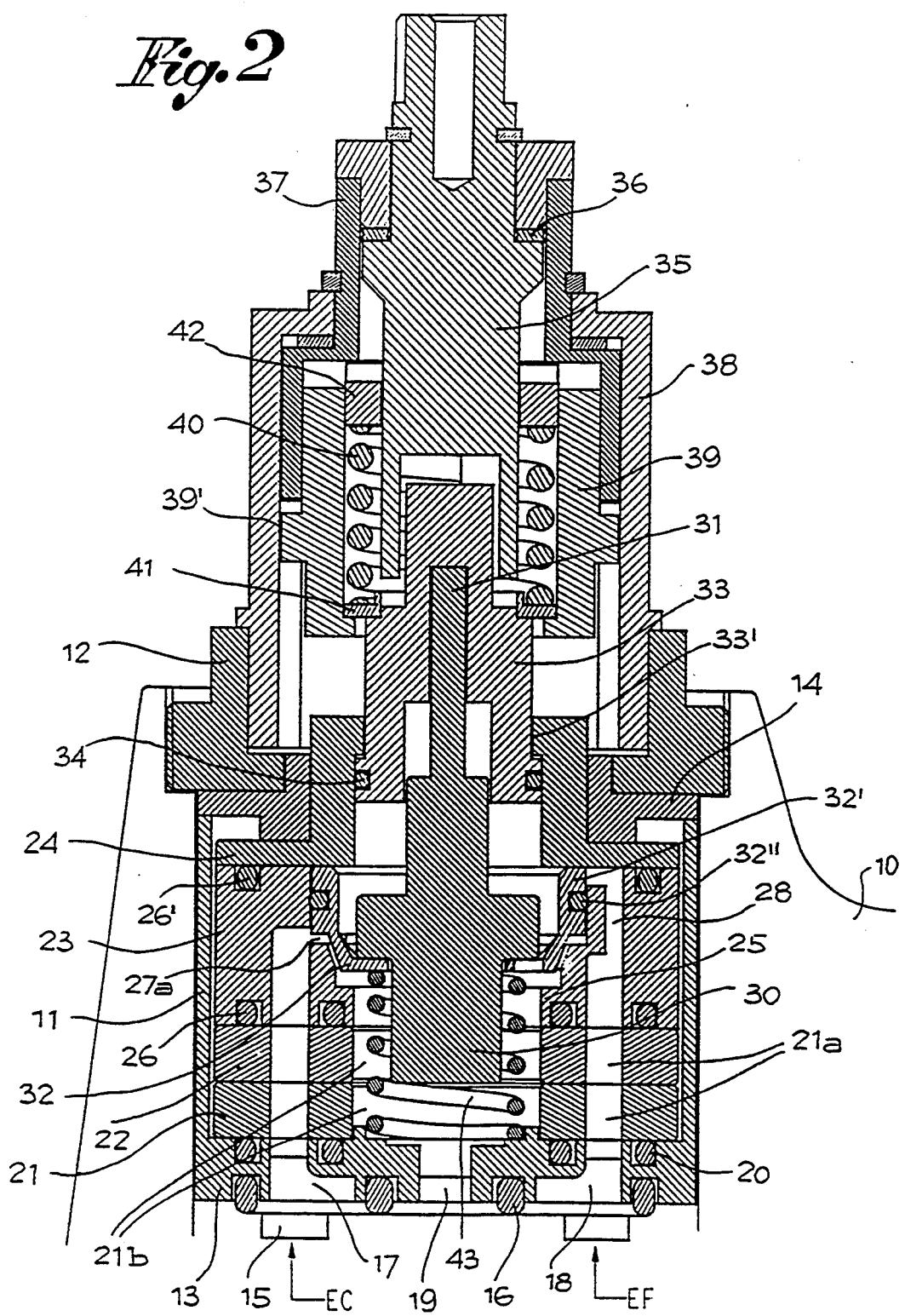
FIG. 2 shows an axial sectional view of the mixer tap, with the inlet passages for hot water supply open and the inlet passages for cold water supply closed.

In the drawing, the reference numeral 10 indicates the body member of a tap designed to receive a thermostatic mixer valve assembly according to the present invention. This valve comprises a body 11 having the same outside dimensions and configuration as the cartridge body of a normal ceramic-disc mixer valve. The body 11 may therefore be inserted into the mixer tap body member 10 and fixed therein by means of a lock nut 12, like any normal cartridge mixer valve.

The valve body 11 comprises a bottom wall 13 and a cover 14. The bottom wall 13 is provided with reference feet 15 for centring the valve body in the tap body member 10, and with seals 16 between the two bodies 10, 11. It also comprises two separate inlet passages 17, 18 for hot and cold water, which are derived from two conduits—not illustrated in the Figures—according to arrows EC and EF respectively, and a central outlet passage 19 for the water to be delivered through the tap 10, seals 20 being provided around the passages 17-19 on the bottom 13.

Between the bottom 13 and the cover 14 of the valve body 11, the following units are mounted in order of superimposition: a fixed ceramic disc 21, a displaceable ceramic disc 22, a rotating pulling sleeve 23 and a pulling plate 24. The two ceramic discs 21, 22 are identical, and each of them—see FIG. 4—is provided with two curved slits 21a, a central hole 21b and peripherical notches 21c. The fixed disc 21 is fitted on the bottom 13 of the body 11 by means of the peripherical notches 21c, so that its curved slits 21a coincide with the inlet passages for hot and cold water supply 17, 18, while its central hole 21b coincides with the central outlet passage 19 on the bottom of the valve body.

The displaceable disc 22 rests and rotates on the fixed disc 21 and is fitted to the pulling sleeve 23 so as to rotate with it. The pulling sleeve 23—see FIG. 1—is provided with two lower tongues 23a which are introduced into the side notches 21c of the displaceable disc 22 and with two upper tongues 23b which ensure connection thereof to the pulling plate 24 during rotation. The pulling sleeve 23 has a central cavity which defines a chamber 25 and is provided with seals 26, 26' located on the displaceable disc 22 on one side and on the pulling plate 24 on the other side.

The central hole of the displaceable disc 22 permanently coincides with the corresponding central hole of the fixed disc 21, while the chamber 25 of the pulling sleeve 23 is open towards and coincides with the central holes of the discs 21, 22.

The pulling sleeve 23 also comprises a first conduit 27 and a second conduit 28, both of which communicate with the central chamber 25. More precisely, the first conduit 27 communicates with the central chamber 25 through at least one radial opening 27a located at a lower level with respect to at least another radial opening 28a, which connects the second conduit 28 with the central chamber 25.

Both conduits 27, 28 are aligned with the curved slits 21a of the displaceable disc 22.

On the other hand, the rotation of the displaceable disc 22 causes positioning of both the curved slits away from, in partial or total coincidence with the corresponding slits provided in the fixed disc 21, thus permitting the inflow of water towards the two conduits 27, 28 and the control of the complete closing and partial or total opening of the valve accordingly.

Both conduits 27, 28 are designed to permit the passage of hot water EC and cold water EF respectively into the chamber 25 through the radial openings 27a and 28a. The water mixes in the chamber and flows towards the delivery spout of the mixer tap through the coinciding central holes 21b and 19 provided in the ceramic discs 21, 22 and in the bottom of the valve body respectively.

A known thermosensitive bulb 30 having an upward stem 31 is provided axially with the central chamber 25 of the pulling sleeve 23 and with the central holes of the ceramic discs 21, 22. It is supported by a cage 32 sliding axially in the chamber 25, between the pulling plate 24 and a shoulder 23 provided in the pulling sleeve. The cage 32 has a seal 32" on the wall of the chamber 25 and is adequately finned to permit the passage of water around the thermosensitive element 30 towards the outlet 19 on the bottom of the valve. The cage 32 has also an annular portion 32' which faces the radial openings 27a, 28a for the controlled opening/closing thereof. The cage 32 has openings of sufficient size for water flow from the upper end of the central chamber 25, through the cage 32, and into the lower end of the central chamber 25.

The upper stem 31 of the thermosensitive bulb 30 is rotably fitted in a pulling bush 33, which is coupled to and rotates with the pulling plate 24. For this purpose, pulling bush 33 and pulling plate 24 are connected through a polygonal coupling 33' which permits axial displacements of the bush with respect to the pulling plate. Between the pulling bush and the pulling plate a seal 34 is also provided in order to prevent any rise of water.

The pulling bush 33, though free to move axially, is rotably coupled to a control rod 35 which is rotably mounted in a regulation handle 37 by means of an interposed bearing 36 and is provided with a control grip, not illustrated in the Figures. The regulation handle 37 is supported by a fixed outer case 38 rising on the lock nut, to which it is fixed. The regulation handle 37 is susceptible of rotation without translating axially and, through a threaded coupling, it interacts with an element 39, which is located around the control rod 35 and the pulling bush 33 and which can be displaced axially without rotation inside the outer fixed case 38 owing to an intermediate polygonal portion 39' thereof.

It should be noted that the stem 31 of the the thermosensitive bulb 30 axially rests against the pulling bush 33 and that the bush is pushed in the direction of the thermosensitive bulb by a calibration spring 40.

This spring 40 is located inside the element 39 and is mounted, loaded, between a spring-holder 41, which rests simultaneously on the element 39 and on the pulling bush 33, and a calibration bush 42 screwed in the element so as to permit the setting of water temperature by calibrating the spring 40 and positioning the thermosensitive bulb 30. Contact between the thermosensitive bulb and the pulling bush is also ensured by a spring 43 acting in opposition to the calibration spring 40, the spring 43 being arranged and operating between the bottom of the cartridge body and the cage 32 supporting the thermosensitive element.

The above described embodiment is such that rotation of the control rod 35 by the grip is associated with rotation of the pulling bush 33 and consequently with rotation of the pulling plate 24, which causes rotation of the pulling sleeve 23 of the rotating disc 22 of the valve assembly for the opening/closing of water passages. Furthermore, the thermosensitive bulb 30 and the cage 32 supporting it may be displaced axially by the temperature control means 37, 39 and 42 independently of the pulling bush 33 and of the pulling plate 24, such displacements being contrasted downwards by the spring 43 and upwards by the calibration spring 40.

Displacements of the cage 32, and therefore of the annular portion thereof 32', permit to change the openings of the radial holes 27a, 28a in order to close them completely, or partially, so as to control hot and cold water supply to the chamber 25 of the valve body. On the other hand, the thermosensitive element resting against the pulling bush 33 is susceptible of positive and negative dilatation according to the temperature of the water flowing through the chamber 25.

Such dilatation of the thermosensitive sensor automatically cause displacement of the thermostatic unit, and therefore of the cage, in the proper direction, so as to steadily maintain the required mixing conditions and particularly the temperature of the water delivered.

Substantially, rotation of the control lever—not illustrated—is therefore associated with the opening/closing of the valve through the coaxial kinematism constituted by the control rod 35, the pulling bush 33, the pulling plate 24, the sleeve 23 and the displaceable disc 22, whereas rotation and positioning of the handle 37 permit to set the temperature of the water delivered by the mixer tap. In effect, rotation of the handle causes the element 39 to reposition the bush and cage with respect to the water inlet passages to the chamber of the valve body.

Moreover, such regulation may be carried out in any other appropriate way within the knowledge of technicians working in this field, always keeping the thermosensitive element free from any control functions.

I claim:

1. A hot and cold water mixer vane assembly with thermostatic regulation which comprises a valve body enclosing a ceramic-disc valve assembly and having the same structure, outer dimensions, inlet and outlet passages for water and fixing modalities as a normal mixer valve, characterized in that it comprises a thermosensitive bulb arranged axially, centred and contiguous with the valve assembly, susceptible of axial dilatation only and free from any control functions for the opening/-closing of the valve;

two overlapping ceramic discs, one fixed in the valve body and the other displaceable, resting and rotating on the fixed disc and in which said discs are provided with slits for separate inflow of hot and cold water and with one central outlet hole for the passage of water towards the spout of the mixer tap body, the displaceable disc being designed to rotate for the opening/closing of the water inlet slits, wherein the displaceable disc is connected to a pulling sleeve rotably mounted in the valve body and rotably coupled to a pulling plate which is rotably driven in the cover of said body, wherein the pulling sleeve defines two conduits coinciding with the inlet slits for hot and cold water provided in said displaceable disc and, centrally, a chamber open towards the central holes of the two overlapping discs, such conduits being in communication with said chamber through radial openings at different levels, wherein a thermosensitive bulb is located in said chamber, axially with said discs and is displaceable axially together with a supporting cage having an annular portion which can be displaced so as to face said radial openings, the thermosensitive bulb being provided with a stem coupled to an axially interacting with a pulling bush designed to cause rotation of the pulling plate and, through the pulling sleeve of the displaceable disc for the opening/closing of the water inlet slits on the one hand and, on the other hand, to control the axial displacements of the thermostatic bulb and of said cage through the annular portion in order to vary the opening of said radial holes according to any changes in water temperature, said axial displacements of the pulling bush, of the thermosensitive bulb and of the cage being contrasted by springs.

2. A mixer valve with thermostatic regulation as claimed in claim 1, wherein the two overlapping ceramic discs are identical, wherein the pulling sleeve is connected to the displaceable disc on one side, and to the pulling plate on the other side, wherein the pulling bush is connected the pulling plate in order to rotate with it though being displaceable axially with respect to the plate itself, and wherein said pulling bush is rotably coupled, but displaceable axially, to a rotating control rod operated by a handle.

3. A mixer valve with thermostatic regulation according to claim 2, wherein a fixed case is mounted above the valve body, concentrically with the control rod and with the pulling bush and wherein means for regulating and calibrating the position of the thermosensitive bulb are interposed among said case, said control rod and said pulling bush, the said means including a regulation handle which rotates around said control rod and in the said fixed case.

4. A mixer valve comprising:

a valve body having first and second inlet passages, and having an outlet passage;

a first disk positioned in said valve body and fixed to said valve body, said first disk defining first and second slits, and also defining a central hole, said first slit being aligned with said first inlet passage, and said second slit being aligned with said second passage, said central hole being aligned with said outlet passage;

a second disk positioned in said valve body and adjacent said first disk, said second disk defining first and second slits, and defining a central hole aligned with said central hole of said first disk, said second disk being rotatable in said valve body with respect to said first disk to bring said first and second slits of said second disk in and out of alignment with said first and second slits of said first disk;

a pulling sleeve rotatably mounted in said valve body and connected to said second disk, said pulling sleeve defines first and second conduits aligned with said first and second slits of said second disk respectively, said pulling sleeve also defining a central chamber aligned with said central holes of said first and second disks, said pulling sleeve defining a first radial opening communicating said first conduit with said central chamber, said pulling sleeve defining a second radial opening communicating said second conduit with said central chamber, said first and second radial openings being spaced axially;

a thermosensitive bulb positioned in said central chamber and having means for axially expanding and contracting based on a temperature of said bulb;

a supporting cage connected to said bulb and axially slidable in said central chamber, said support cage having an annular portion positioned to block and open said first and second radial openings based on an axial position of said cage;

a pulling plate rotatably mounted in said valve body and connected to said pulling sleeve;

a pulling bush axially slidable in said pulling plate and rotatably fixed with said pulling plate, said pulling bush axially interacting with said bulb;

thermal control means for adjusting an axial position of said pulling bush and said thermosensitive bulb independently of rotation of said pulling bush;

first and second spring means for biasing said pulling bush and said bulb in opposite axial directions.

5. A mixer valve in accordance with claim 4, wherein:

said first and second disks are substantially identical;

said pulling sleeve has one end connected to said second disk and another end connected to said pulling plate;

a control rod is connected to said pulling bush for rotating said pulling bush, said pulling plate and said pulling sleeve, said control rod being axially displaceable with respect to said pulling bush.

6. A mixer wane in accordance with claim 5, wherein:

a case is fixed above said valve body and substantially concentric with said control rod and said pulling bush, said thermal control means, said control rod and said pulling bush being positioned in said case;

said thermal control means including a handle which is rotatable about said control rod and has a portion inside said case.

* * * * *